Aug. 23, 1960   B. J. HILL   2,949,651
WEATHER STRIPPING
Filed Jan. 20, 1958   2 Sheets-Sheet 1
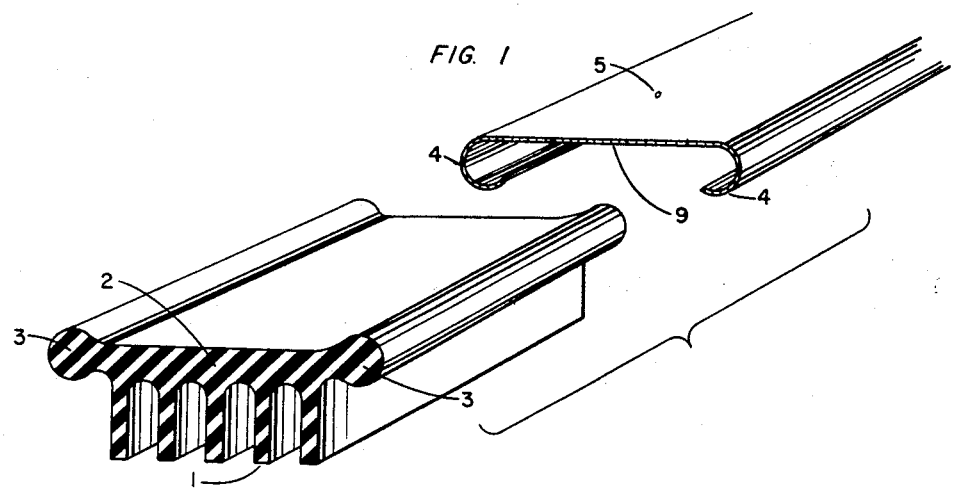
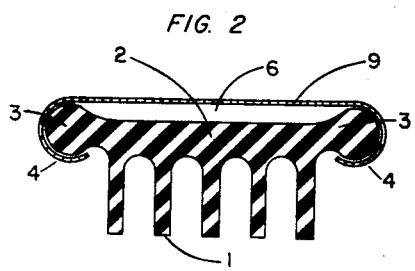
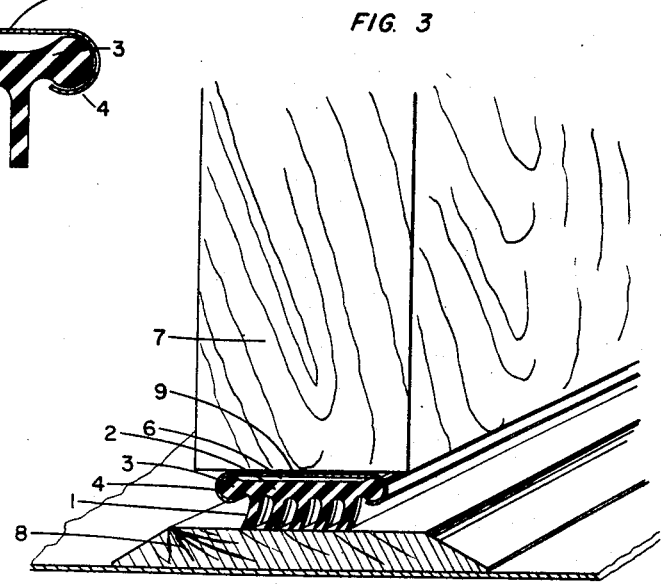
INVENTOR:
Benjamin J. Hill Aug. 23, 1960   B. J. HILL   2,949,651
WEATHER STRIPPING
Filed Jan. 20, 1958

United States Patent Office 2,949,651
Patented Aug. 23, 1960

2,949,651

WEATHER STRIPPING

Benjamin J. Hill, 512 W. Midland, Shawnee, Okla., assignor of one-half to Victor Jay Hill, Tulsa, Okla.

Filed Jan. 20, 1958, Ser. No. 710,162

5 Claims. (Cl. 20—69)

This invention pertains to an improved type of weather stripping. The weather stripping is particularly characterized by comprising a combination of a rigid housing and a flexible, elastic strip which may be readily assembled or disassembled. The weather stripping is especially useful in effecting a weather seal between the bottom of a door and its threshold. This application is a continuation-in-part of application No. 469,472, filed November 17, 1954, in the name of the same inventor, which has now become abandoned.

Weather stripping is widely used for sealing around the edges of doors, windows, and other swinging-type closure members. It finds particular application in sealing the space between the bottom of a door and its threshold. Weather stripping serves the general function of preventing the wind and rain from entering a house or other building structure. Ordinary weather stripping, however, is unable to seal against both rain and wind. In other words, it usually either stops the rain and does not stop the wind, or vice versa. For example, metal weather stripping in the form of metal shields, flaps, or the like readily sheds rain but is not completely effective in stopping the wind. Similarly, non-metal weather stripping such as felt and the like is effective in stopping the wind but is not very resistant to water.

Another limitation or disadvantage of conventional weather stripping concerns the manner in which the weather strips are mounted on a door or other closure member. Thus, it is the general practice to nail, screw, or otherwise permanently attach presently available felt strips, metal strips, etc., to the bottom of a door. As a result of this type of installation, the weather strips operate with a reduced sealing efficiency; and they also have a greatly reduced useful life. Furthermore, they are usually not self-adjusting in their sealing action in that irregularities in the surfaces sealed may preclude an effective sealing action.

Conventional weather stripping is also all too often apt to fail because of the repeated flexing and stresses it must withstand. In this connection, it has been observed that failure of conventional weather strips generally occurs in those portions of the strips which are rigidly attached to a door or the like.

The present invention overcomes the shortcomings of the prior art by using a weather stripping which combines a weather strip of novel design with a housing which receives the strip and effectively attaches it to a door or other closure member. The invention is especially effective and useful in sealing the space between the bottom of a door and its threshold, but it also has valuable utility in sealing other swinging-type closure devices. The weather stripping of the invention is especially characterized by its inherent abiilty to effect a weather-tight seal in spite of irregularities in the surface being sealed. In other words, the weather strip is self-adjusting and automatically adapts itself to various sealing problems.

The weather-strip portion of the weather stripping of the present invention may be fabricated from a wide range of materials. In general, the material must be pliable in the sense that it must possess both softness and flexibility. It must be tough enough to resist wear, but it must be sufficiently soft to enable it to mold itself around surface irregularities; and it must be flexible enough to permit a reversal of its disposition. It must also be elastic in the sense that it is able to regain or recover its original shape after it has been flexed or temporarily deformed. In a sense, it might be stated that the material should be rubbery elastic in character in that it should possess the characteristics of resiliency, softness, elasticity, and flexibility popularly associated with rubber. The material should also be reasonably resistant to oxidation by air, and it should have the ability to shed water. Natural rubber compositions, accordingly, may be used; but synthetic rubbers such as neoprene, butyl rubber, Perbunan, and the like are preferred because of their greater resistance to oxidation. Neoprene with a durometer value of about 60 has proven to have a very desirable combination of the characteristics set out above and to be especially valuable in forming the weather strips of this invention.

The housing members that are used in the practice of the invention may also be constructed from a variety of materials. In general, the material should be corrosion- and weather-resistant; and it should be strong enough to retain and support the weather-strip portion. Suitable materials of construction, for example, include stainless steel and aluminum; and it is also contemplated that fiberglas, synthetic resins, and the like may also be employed. Aluminum extruded to the desired shape has been found to be especially suitable for use.

The exact size and proportions of the weather stripping of this invention are not especially critical. The weather stripping, however, must possess the necessary width, length, and thickness to enable it to conform to the size of a door or other closure member to which it is applied. It also must occupy sufficient volume to seal any given opening.

The invention may be better understood by reference to the attached drawing in which:

Figure 1 is an exploded view of the weather strip and the housing components of the invention separated from one another.

Figure 2 is a cross-sectional view of the weather strip and the housing combined into a weather-stripping structure.

Figure 3 is a fragmentary perspective view of an embodiment of the invention in use.

Figure 4:
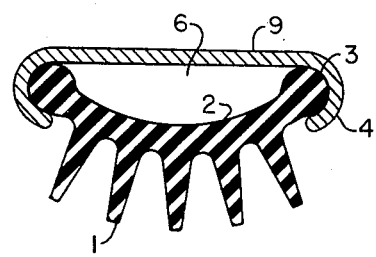
Figure 4 is a cross-sectional view of a weather strip and housing combination which constitutes a variation of the invention.

Turning first to Figure 1, there are illustrated in this figure a weather strip 2 and a housing 9. The weather strip 2, as illustrated, is made of rubber; however, it may be fabricated from either natural or synthetic rubber, various synthetic plastics, or any other pliable materials that can be used as such. It has a series of fins or flaps 1 on its underneath side which extend its entire length. It also possesses rims or beads 3 which extend its entire length and which are preferably round. The fins 1, it will be noted, may be made simply by cutting slits in the weather-strip material. However, it is preferred that the weather strip including the edge rims or beads 3 and the fins or flaps 1 be fabricated by an extrusion process. It has been found that neoprene extruded to have the desired shape is an especially effective material to employ. Housing 9, which as mentioned earlier is preferably made of extruded aluminum, is attachable to the bottom surface of a door or to an edge of a similar closure member by means of screws extending through suitably placed holes 5. It will be recognized, of course, that other fastening devices such as nails, staples, or the like may also be adapted for this purpose. It is merely necessary that the housing 9 be secured firmly or rigidly to a closure member such as a door in order that it may receive and support the weather strip 2.

In order that the housing member 9 may support a weather strip such as that shown in Figure 1, it is provided with troughs 4 within which the rims or beads 3 may be inserted. It is a particular feature of the invention that no nails, screws, or other fastening devices are needed or desired for retaining the weather strip 2 within a housing member of this invention. Instead, the troughs of the housing member and the beads or rims of the weather-strip member are formed so that the beads or rims are automatically retained within the troughs once they are inserted therein. Expressed otherwise, the housing and weather-strip assemblies of this invention may be stated to be self-retaining or self-locking in character. This feature is an especially desirable one, since removal of the weather strip from the housing may be very simply realized by merely pulling the strip member from the housing. In conventional weather-stripping assemblies, the weather strip—if it is mounted within a housing—is so securely fastened that it is necessary to first remove the door or other closure member itself before the weather strip can be removed.

In a preferred form of the invention, the beads or rims 3 and the troughs 4 are rounded such that the beads or rims may be slid within the troughs. The rounded bead and rounded trough construction also enables a degree of rotational movement to occur between these members, with the result that strip failures due to flexing are greatly reduced.

Figures 2 and 3 show the invention with its component parts in assembled form. The rims 3 of the weather strip 2 are held within the troughs 4 in a manner such that the fins or flaps 1 protrude out from the housing 9. The fins or flaps are therefore in a position to bear against the threshold of a door and to effect a seal therebetween. It will be especially noted that the lower surface of the housing 9 and the upper surface of the weather strip 2 combine to define a hollow channel or groove 6 therebetween which is effectively concave relative to the weather strip. This channel or groove extends the full length of the strip and constitutes an important feature of the invention, since it provides flexibility and a self-adjusting characteristic in the operation of the device. In other words, the flexible and elastic characteristics of the fins enable them to flex back and forth as they are swept back and forth across a threshold. The channel 6 aids and abets the action of the fins, since the main body portion of the strip member may be displaced into this channel when a reversal of the disposition of the fins causes them to develop an upward thrust.

Figure 3 helps to illustrate how the apparatus of this invention operates when it is applied to the problem of closing or sealing the opening between the underneath side of a door 7 and its threshold 8. As pointed out earlier, housing 9 is attached as by means of screws or other fastening devices to the underneath side of the door 7 with its troughs 4 in a depending position. Strip 2 is assembled in the housing 9 as by sliding or otherwise inserting the edges 3 within the troughs 4. Fins 1 protrude downward from the main body of the strip 2 and exert a sweeping action against the threshold 8 when the door 7 is swung to and fro across the threshold.

When the strip 2 is assembled within the housing 9, the fins or flaps 1 protrude downward from the strip and thrust against the threshold 8. Thus, when the door 7 is opened and closed, the fins sweep back and forth across the threshold. The flexibility of the fins, plus a degree of rotational movement of the beads or rims 3 within the rounded trough 4, plus the volume and structure of channel 6 enable the fins to flex and reverse their disposition without undue stresses or flexing forces. These characteristics also enable the fins to continuously apply pressure to the top of the threshold 8 and thereby provide complete sealing and insulation against wind, rain, dust, etc.

As mentioned earlier, the rims or edges 3 of the weather strip 2 are designed so as to be self-locking or self-retaining within the troughs 4. In other words, no nails or equivalent mechanical fastening devices need be used to hold the weather strip within the housing. To aid this self-locking or self-retaining feature, the lateral distance between the edges or rims of the strip 2 may be made somewhat greater than the lateral distance between the troughs 4. Thus, when the trough and the weather strip are assembled, the former member will tend to bow outward from the latter member as shown in Figure 4. The inherent elastic resiliency of the strip member causes it—upon being bowed—to exert a lateral thrust against the walls of the troughs 4. This lateral thrust aids the natural inclination of the strip member to retain itself within the housing member.

The invention claimed:

1. Weather stripping for sealing the opening between the underneath surface of a door and the threshold of a doorway which comprises in combination an elongated flat metal housing attachable to the underneath surface of the door, each long edge of said housing having an inward-opening, circular trough depending therefrom, an elongated elastic pliable strip having rounded lengthwise edges and being adapted to slide within said housing with one of said long edges residing within each trough in rotatable relation therewith, the upper surface of said strip defining a hollow groove with the metal housing, longitudinal fins integral with the lower surface of said strip and protruding from said housing.

2. Weather stripping which comprises in combination an elongated rigid housing member having a flat central portion and an inward-facing trough depending from each long edge, a rubbery elastic strip member having a flat central portion and a bead extending along each long edge insertable within said troughs, the width of said strip member being sufficiently greater than the lateral distance between said troughs such that the strip member bows outward from said housing member when said beads are inserted with said troughs, said strip member including a plurality of fins depending therefrom when said strip member is within said housing member, said fins extending the length of said strip member.

3. Weather stripping which comprises in combination a flexible, rubbery elastic strip member having a central body portion and a bead along each long edge thereof, said body portion being flat on one side and including at least one integral fin extending from and running the length of the opposite side thereof, a weather-resistant rigid housing member having a central body portion adapted to be attached to the lower surface of a swinging closure member, each long edge of said housing member turned downward and inward to define a trough along each long edge, said housing member adapted to receive said strip member by insertion of one of said beads within each trough thereof, said strip member extending the length of said housing member and being sufficiently wider than the lateral distance between said troughs to cause said strip member to bow outward from said housing member upon insertion of said beads.

4. Weather stripping for use along the threshold surface of doors and other swinging closure members which comprises in combination an elongated flexible rubbery elastic strip member having a central body portion and beading extending along each long edge thereof, said body portion having a flat surface on one side and a plurality of laterally spaced, integral fins extending along and protruding from the opposite side thereof, an elongated weather-resistant metal housing member having a flat central body portion adapted to be rigidly connected to the threshold surface of a closure member, each long edge of said central body portion depending therefrom and facing inward thereof to define a rounded trough, said strip member adapted to be assembled with said housing with said flat side next adjacent said housing and with a separate bead inserted within each said trough, said strip member being sufficiently wider than the lateral distance between said troughs whereby said strip member bows outward from said housing member when assembled therein, said weather strip additionally having sufficient elasticity to resist withdrawal from said housing.

5. Weather stripping which comprises in combination an elongated weather-resistant housing having a flat central portion, the upper surface of said central portion adapted to be attached to one edge of a swinging-type closure member, each long edge of said housing member turned downward and centrally relative to the central portion to define a trough along each long edge, an elongated elastic flexible strip member including a substantially flat central portion, a bead extending along each long edge thereof, said strip member also including a plurality of laterally spaced fins depending from the lower surface of said body portion and extending the length thereof, said strip member and said housing member being assemblable by insertion of a separate one of said beads within a separate one of said troughs and with the upper surface of said body portion facing toward the central portion of said housing member, the lateral distance between said beads being sufficiently greater than the lateral distance between said troughs to cause said strip member to bow outward relative to said housing member.

References Cited in the file of this patent

UNITED STATES PATENTS

| | | |
|---|---|---|
| 1,560,097 | Peterson | Nov. 3, 1925 |
| 2,004,722 | Hamm | June 11, 1935 |
| 2,188,815 | Murphy | Jan. 30, 1940 |
| 2,378,163 | Thomas | June 12, 1945 |
| 2,599,183 | Kessler | June 3, 1952 |
| 2,739,358 | Kunkel | Mar. 27, 1956 |

FOREIGN PATENTS

| | | |
|---|---|---|
| 764,782 | Great Britain | Feb. 18, 1953 |